United States Patent [19]
Roach

[11] Patent Number: 5,879,596
[45] Date of Patent: Mar. 9, 1999

[54] LOW TEMPERATURE PROCESS FOR MAKING POLYURETHANEUREAS

[75] Inventor: David H. Roach, Newark, Del.

[73] Assignee: E. I. du Pont de Nemours and Company, Wilmington, Del.

[21] Appl. No.: 860,981

[22] PCT Filed: Nov. 13, 1996

[86] PCT No.: PCT/US96/18142

§ 371 Date: Jul. 15, 1997

§ 102(e) Date: Jul. 15, 1997

[87] PCT Pub. No.: WO97/18252

PCT Pub. Date: May 22, 1997

[51] Int. Cl.$^6$ .............................. C08G 18/08; D01F 6/78
[52] U.S. Cl. ................. 264/28; 264/140; 264/205; 264/211; 264/328.2; 264/331.19; 528/61; 528/68; 528/76; 528/80; 528/85; 528/481; 528/906
[58] Field of Search ............................ 264/28, 140, 205, 264/211, 328.2, 331.19; 528/61, 68, 76, 80, 85, 481, 906

[56] References Cited

U.S. PATENT DOCUMENTS

| | | | |
|---|---|---|---|
| 3,480,456 | 11/1969 | Forkner | 427/4 |
| 4,070,346 | 1/1978 | Schnoring et al. | 528/68 |
| 4,083,831 | 4/1978 | Santosusso | 528/76 X |
| 5,061,426 | 10/1991 | Frauendorf et al. | 264/205 |

FOREIGN PATENT DOCUMENTS

| | | | |
|---|---|---|---|
| 2-90930 | 3/1990 | Japan | 528/481 |

OTHER PUBLICATIONS

Translation of Japanese Patent Application Publication Kokoku 55–30,008 (Published Aug. 8, 1980).

H. Mark et al, Extrusion, *Encyclopedia of Polymer Science and Engineering*, 6, 571–631, 1986.

H. Mark et al, Plastics Processing, *Encyclopedia of Polymer Science and Engineering*, 11, 273–278, 1988.

H. Mark et al, Characterization of Polymers, *Encyclopedia of Polymer Science and Engineering*, 3, 299–300, 1985.

H. mark et al, Fibers, elastomeric, *Encyclopedia of Polymer Science and Engineering*, 6, 733–755, 1986, 3rd Edition.

H. Mark et al, Elastomeric, *Encyclopedia of Polymer Science and Engineering*, 10, 624–638, 1993.

H. Mark et al., Fibers, Manufacture, *Encyclopedia of Polymer Science and Engineering*, 6, 802–839, 1986.

H. Mark et al, Blow Molding, *Encyclopedia of Polymer Science and Engineering*, 2, 447–448, 1985.

H, Mark et al, Coating Methods, *Encyclopedia of Polymer Science and Engineering*, 3, 563–565, 1985.

*Primary Examiner*—Leo B. Tentoni

[57] ABSTRACT

A process for making polyurethaneureas using cryogenic mixing is provided. Such polyurethaneureas are useful for making spandex and, ultimately, various types of clothing. The process involves cooling an isocyanate prepolymer or the like to a temperature of less than about –100° C., forming a powder from the isocyanate prepolymer, adding at least one chain extender and/or chain terminator, and warming the powder to at least about room temperature to produce a polyurethaneurea. Such polyurethaneureas are useful for making spandex and, ultimately, various types of clothing.

14 Claims, No Drawings

LOW TEMPERATURE PROCESS FOR MAKING POLYURETHANEUREAS

FIELD OF THE INVENTION

A cryogenic process for making polyurethaneureas is disclosed. Such polyurethaneureas are useful for making spandex and, ultimately, various types of clothing.

TECHNICAL BACKGROUND

Polyurethaneureas are used to make "spandex," herein defined as a manufactured fiber in which the fiber-forming substance is a long-chain synthetic polymer comprised of at least 85% of a segmented polyurethane. Spandex, in turn, is used to make many articles of commerce, especially various types of clothing, including swimsuits, hosiery, intimate apparel, outerwear and the like. Polyurethaneureas also find use in molded and extruded products. Polyurethanes may be blended with other materials before being spun, molded, and/or extruded into products.

Polymers used in making spandex are themselves usually made by forming a prepolymer between a polymeric diol and a diisocyanate, and then reacting the resulting prepolymer with a diamine in a solvent such as N,N-dimethylacetamide (DMAc), N-methylpyrrolidone (NMP) or dimethylformamide (DMF). (The aforementioned prepolymer is sometimes referred to as a "capped glycol.") The resulting polymer chains may then be extended by further reaction with one or more chain extenders, typically diamines. The chains may subsequently be terminated by the addition of a chain terminator, e.g., a monoamine. This chain terminator can be mixed with the chain extender or can be added separately, after the chain extender.

From an economic standpoint, it would be desirable to prepare polyurethaneureas, suitable for use in spandex and other applications, in the substantial absence of solvent, and to be able to either melt spin, solution spin, or isolate such polymers for later spinning.

Processes for making and using polyurethaneureas are well known to those skilled in the art. See H. Mark, et al., Ed., *Encyclopedia of Polymer Science and Engineering*, Vol. 6 (3d ed. John Wiley & Sons, Inc., New York 1986) at pages 733–755, and *Kirk-Othmer Encyclopedia of Chemical Technology*, Vol. 10 (4th ed. John Wiley & Sons, Inc., New York 1993) at pages 624–638.

U.S. Pat. No. 3,480,456 describes the grinding of a thermoplastic coating materials in blenders, attritors and hammer mills at temperatures to $-50°$ C. using dry ice (solid $CO_2$). Japanese Patent Application Publication 55-30,008 discloses a process for the preparation of thermoplastic polyurethane powder while adding dry ice immediately before, simultaneously, or immediately after adding the chain-propagating agent.

SUMMARY OF THE INVENTION

This invention describes a process for making a polyurethaneurea composition comprising:

(a) cooling an isocyanate prepolymer or an equivalent thereof to a temperature that is the lesser of the $T_g$ of the isocyanate prepolymer and $100°$ C.;

(b) forming a powder from said isocyanate prepolymer;

(c) maintaining said powder at said temperature while adding at least one chain extender and optionally one or more chain terminators; and (d) warming said powder to at least about room temperature to produce a polyurethaneurea.

The present invention also includes a process for making a fiber, a film, and a molded and/or extruded product, which process includes the above steps. The present invention also includes products made by this process. Finally, the present invention includes a powder made according to the present process, which powder may be stored or transferred before being spun, extruded, molded, or otherwise processed into a fiber, film, or shaped product.

DETAILS OF THE INVENTION

For a process according to the present invention, a starting material can be formed from the reaction product of a polymeric diol with an isocyanate. The polymeric diol and isocyanate are sometimes referred to herein as reactive precursors. The reaction product, an isocyanate prepolymer (also known as a "capped glycol"), is then cooled to a temperature of about $-100°$ C. or less. Chain extenders such as diamines or glycols may be added to the mixture, which is subjected to grinding to produce a fine powder. Grinding can take place, however, at any time during this process. Included within the meaning of isocyanate prepolymer are equivalents thereof. For instance, one equivalent is a mixture (in a suitable molar ratio) of polymeric diol and diisocyanate that is designed to form in situ an isocyanate prepolymer.

By the term "polymeric diol" is meant herein a polyether, polyester, or polycarbonate that contains two hydroxyl groups, most commonly end groups on the polymer. Suitable polyether diols include, but are not limited to, polytetramethyleneetherglycol and the like, and copolymers thereof. A preferred polyether diol is polytetramethyleneether diol with a molecular weight of 1000 to 5000. Polyurethaneureas made from polyether diols are called polyetherurethaneureas.

By aliphatic diamine is meant a compound in which the amino groups are directly bound to an aliphatic or cycloaliphatic carbon atom. There may be other nonreactive functional groups or other hydrocarbyl groups (such as an aromatic ring) present in the aliphatic diamine. The amino groups are primary and/or secondary amino groups. It is preferred that both amino groups are primary. Preferred aliphatic diamines have the formula $H_2N(CH_2)_nNH_2$, wherein n is an integer of 2 to 12, preferably 2 to 6, and bis(4-aminocyclohexyl)methane. Other diamines useful in the present invention include, for example, ethylenediaamine, hexamethylenediamine, 1,3-propanediamine, 2-methyl-1,5-pentanediamine, 1,3-cyclohexanediamine, 1,2-propanediamine, m-xylylenediamine, and N-methylbis(3-aminopropyl) amine, and mixtures thereof.

Hydroxyl-terminated polyesters which may be used in conjunction with the present invention include, but are not limited to, the reaction products of ethylene glycol, 1,2-propanediol, tetramethylene glycol, hexamethylene glycol, and/or 2,2-dimethyl-1,3-propane diol and the like, with diacids such as adipic acid, succinic acid, nonanedioic acid, and/or dodecanedioic acid, and the like. Polyurethaneureas made from polyester diols are called polyesterurethaneureas.

Also contemplated as polymeric diols for use in the present invention are polyetheresters comprised of elements of the above polyethers and polyesters, and diol-terminated polycarbonates such as poly(pentane-1,5-carbonate)diol and poly(hexane-1,6-carbonate)diol, and the like. Polyurethaneureas made from polycarbonate diols are called polycarbonateurethaneureas.

The diisocyanate may be an aliphatic or aromatic diisocyanate, such as toluene diisocyanate, bis(4- isocyanatophenyl)methane, isophorone diisocyanate, hexamethylene diisocyanate, and bis(4-isocyanatocyclohexyl) methane. A preferred diisocyanate is bis(4-isocyanatophenyl)methane.

There are more moles of diisocyanate present, in the reaction to prepare the prepolymer, than moles of polymeric diol. Preferably the molar ratio of diisocyanate:polymeric diol is about 1.2 to about 2.1, more preferably about 1.5 to about 1.8.

If desired, a monoamine such as diethylamine may be added to control the molecular weight of the final polyurethaneurea, thereby acting as a chain stopper.

Part of the process is carried out at cryogenic temperatures. By the term "cryogenic temperature" is herein meant temperatures that is below the lesser of the $T_g$ of the capped glycol or prepolymer, which is typically less than –85° C., and about –100° C. The temperature may be preferably set at lesser than the minimum temperatures, in order to provide tolerance for variance in process conditions during commercial practice or in order to optimize results. The preferred termperature for grinding depends on prepolymer molecular weight. Generally, for example, lower temperatures are desirable for higher molecular weight. For Type A prepolymer (see below), a temperature of below about –100° C. is preferred, but for Type B prepolymer a lower temperature of –150° C. or less may be needed for the same grinding efficiency because of its higher molecular weight.

By the term "glass transition termperature" or $T_g$ is meant the inflection point of the step transition associated with the glass transition on a DSC (Differential Scanning Calorimetry) trace heated at about 10° C./min. The value for $T_g$ may vary somewhat, for example, with the particular prepolymer and the prepolymer's morphology, thermal history, molecular weight or degree of polymerization (DP), and crystallinity. The $T_g$ values are an average value, subject to statistical variance for a particular measurement.

In one embodiment of the present invention, the cryogenic temperature is that of liquid nitrogen (–195.5° C. to –210° C.). In one such embodiment, the isocyanate prepolymer may be added to the equipment employed for blending and grinding, and cooled to a cryogenic temperature with, for example, liquid nitrogen. At this temperature, the prepolymer becomes a solid and can then be ground to a powder. This grinding can be done in a number of commercially available pieces of equipment, e.g., blenders (primarily for laboratory scale), mills, and micronizers. Final particle sizes of 10–750 μm, preferably 100–200 μm, are suitable. Powder particles that are relatively homogeneous in nature, rather than exhibiting core-shell morphology, may be obtained. By core-shell morphology is meant a particle which has a heterogeneous or non-uniform structure.

As an alternative to liquid nitrogen, a chilled inert gas, such as argon, nitrogen, helium and the like, may be employed in a cooled chamber. In one such embodiment, prepolymer may be atomized into a cooled chamber countercurrent to the flow of a chilled gas. Thus, the present invention may be suitably or preferably carried out at a temperature of less than, for example, –110° C. or less than –130° C. or less than –150° C. up to the temperature of liquid nitrogen, although temperatures less than the temperature of liquid nitrogen may be comparatively less economical.

During or after the time when the prepolymer is ground into a powder, a chain extender, for example, a diamine or glycol, can be added, as well as a chain terminator, for example, a monoamine. While not wishing to be bound by theory, the Applicant believes that the chain extender and/or the chain terminator diffuses at least to some extent into the powder particles. As the powder particles warm to room temperature, its components react in situ.

Many polyurethaneurea products contain additives, which are generally non-reactive and in particulate or slurry form. Such additives can include pigments (e.g., $TiO_2$, carbon black, cobalt blue PB-28 obtained from Americhem, Inc.. Cuyahoga Falls, Ohio), antioxidants (e.g., Cyanox® 1790, a hindered phenolic antioxidant that is 2,4,6-tris(2,6-dimethyl-4-t-butyl-3-hydroxybenzyl)isocyanurate, commercially available from Cytec Industries, West Patterson, N.J.) and stabilizers (e.g., Methacrol® 2462B, a polymer of PICM or bis-(4-isocyanatocyclohexyl)methane and N-t-butyldiethanolamine or 3-t-butyl-3aza-1,5-pentanediol, which stabilizer is made by DuPont Co., Wilmington, Del. and is commercially available).

Catalysts that can also be used in the present reaction system include organometallic compounds such as dibutyltin dilaurate.

Solid particles of other materials, such as other polymers (e.g., poly(p-phenylenediamine terephthalate), abbreviated PPD-T, poly(m-phenylenediamine isophthalate), abbreviated MPD-I, nylon, and various elastomers) can also be added to, or dispersed in, the prepolymer by heating the prepolymer to a temperature of about 50° C. and stirring the mixture in a resin kettle. These solid particles may be added in amounts up to 20% by weight or more, preferably about 5% by weight or less, more preferably about 2% or less, preferably at least about 0.5%. The prepolymer, with the solid particles included therein, can then be processed into fiber, film or other molded product after chain extension with diamine.

Polyurethaneurea in the form of particles may be advantageous, for example, because they can be readily shipped to distant facilities for processing into final products. The powder particles acccording to the present invention are capable of remaining as discrete particles at room temperature, although agglomeration may tend to occur under certain conditions, for example, at a temperature of greater than about 50° C. and an applied pressure of greater than about 300 psi. Thus, powder particles according to the present invention can be stored and shipped in ordinary drums and without refrigeration.

The present process is carried out in the substantial absence of solvent. By "solvent" is meant any liquid which may act as a solvent for any one (or more) of the starting materials or product polyurethaneureas, and which itself is not a reactant or product of the reactions taking place in the process. Small amounts of solvent may be present when needed for convenience. For instance, small amounts of catalyst may be added as a solution. Less than about 20% by weight of the total process mixture should be solvent, preferably less that about 10% by weight, more preferably less than about 2% by weight, and even more preferably no solvent should be present.

Once the polyurethaneurea powder has been made, it can then be used to spin spandex, by melt spinning from, say, an extruder by heating to a temperature at which melt spinning can be done. Fiber can also be made from the powder by dissolving the powder in an appropriate solvent (e.g., DMAc, DMF and NMP) and solution spun. If necessary, salts such as LiCl can be added to the powder and solvent to aid dissolution. Melt and solution spinning are well known processes. See, for example, H. Mark, et al., ed., *Encyclo-* pedia of Polymer Science and Engineering, Vol. 6 (John Wiley and Sons, New York 1986), at pages 802–839, which is hereby incorporated by reference.

Spinning speeds typically used in solution spinning are 150 to 900 m/min. The powder can also be processed into films by well known melt extrusion or solution techniques, or molded into other articles. See, for example, H. Mark, et al., ed., Encyclopedia of Polymer Science and Engineering, Vol. 2 (1985) at pp. 447–448, Vol. 3 (1985) at pages 563–565, Vol. 6 (1986) at pages 571–631, and Vol. 11 at pages 273–278 (John Wiley and Sons, New York), which pages are hereby incorporated by reference. Some uses for films or sheets resulting from this further processing include gloves, shoe soles, golf balls and the like.

The polydispersity of the polymers, in the particles produced according to the present invention compares favorably to the polydispersity of typical polyurethaneureas in the prior art. Polydispersity, as used herein, means the ratio of the weight average molecular weight ($M_w$) to the number average molecular weight ($M_n$) for the polymer in question, i.e. $M_w/M_n$ which is a measure of the molecular weight distribution. It is well known that the molecular weight distribution of a polymer is an important variable and contributes to many physical properties and processing characteristics. Generally, with narrower molecular weight distribution, and thus lower polydispersity, the physical properties and processing parameters of the polymer are improved. See H. Mark, et al., Ed., Encyclopedia of Polymer Science and Engineering, Vol. 3, John Wiley and Sons, Inc., New York, 1985, pp. 299–300. Also, the $M_w$, for the inventive material is often in the range of about 150,000 to about 300,000.

In the Examples below, the following test methods were used:

ASTM D-2731 (adopted in 1973, presently discontinued) for testing elastic properties;

ASTM D-2653 (adopted in 1973, presently discontinued) for testing tensile properties; and ASTM D-2240 for Shore D hardness.

The glass-transition temperature of each sample was determined by Differential Scanning Calorimetry (DSC) using a TA Instruments® DSC 910 (commercially available from TA Instruments, New Castle, Del.). The instrument was calibrated with indium consistent with the instrument documentation. The samples were analyzed as received using 5–10 mg ±0.0005. The samples were sealed in aluminum pans and then heated from room temperature to 300° C./min at 10° C./min in a nitrogen purged environment. Calculations were done with the TA instrument software.

Definitions

The following abbreviations are used in the examples below:

NMR=nuclear magnetic resonance

GPC=gel permeation chromatography $M_n$=number average molecular weight $M_w$=weight average molecular weight DMAc=N,N-dimethylacetamide, Aldrich Co., Madison, Wis.

Hytrel® 4056=polyester elastomer with hardness of 40 D, as measured by ASTM D-2240, DuPont Co., Wilmington, Del.

Hytrel® 5556=polyester elastomer with hardness of 55 D, as measured by ASTM D-2240, DuPont Co., Wilmington, Del.

Hytrel® 7246=polyester elastomer with hardness of 72 D, as measured by ASTM D-2240, DuPont Co., Wilmington, Del.

dpf=denier per filament gpd=grams per denier

Type A prepolymer (capped glycol)=the reaction product of 1800 number average molecular weight polytetramethyleneether glycol and bis(4-isocyanatophenyl) methane in a ratio of 1.7 moles diisocyanate per mole of polymeric glycol.

Type B prepolymer (capped glycol)=the reaction product of a 3400 number average molecular weight polyester and bis(4-isocyanatophenyl)methane in a ratio of 1.8 moles diisocyanate per mole of polymeric glycol. The polyester is the reaction product of a 59/41 mole ratio of ethylene glycol and butylene glycol with adipic acid.

EXAMPLE 1

Production of Polyether Polyurethane Powder

A 1 liter Waring® blender was cooled by adding ~0.5 liter of liquid nitrogen and allowing the temperature to equilibrate for ~5 minutes. In the amount of 110 grams, Type A capped glycol was added to the Waring® blender and allowed to cool. The blender was then run on the high speed setting for 15 seconds to reduce the glycol to a powdered form. Another ~0.5 liter of liquid nitrogen was added to the powder, and 1.87 grams of ethylenediamine was added dropwise to the mixture. Then 0.33 gram of diethylamine was added dropwise, and the entire mixture blended on the high speed setting for another 15 seconds. The resulting powder mixture was then allowed to warm to room temperature. The material retained its powdered form after polymerization, and the powder was subsequently characterized by NMR and GPC. The results show a material with a molecular weight of $M_w$=300,000 and a polydispersity of 1.7. The NMR shows a fully reacted system typical of polyetherurethane.

EXAMPLE 2

Production of Polyester Polyurethane Powder

A 4 liter Waring® blender was cooled by adding ~2 liters of liquid nitrogen and allowing temperature equilibration for about 5 minutes. To the blender was added 372.9 grams of Type B capped glycol, which was allowed to cool. The blender was then run on high speed setting for ~15 seconds to reduce the glycol to powdered form. Another 2 liters of liquid nitrogen was added to the blender and 5.25 grams of ethylenediamine was added and allowed to freeze. Then 0.39 grams of diethylamine was added dropwise, and the entire mixture blended at the high speed setting for another 15 seconds. The powder was then allowed to warm to room temperature. The material retained its powdered form after polymerization, and the powder was subsequently characterized by GPC. The results show a material with a molecular weight of $M_w$=136,000 and a polydispersity of 2.0.

EXAMPLE 3

Fiber Spinning of Powder from Example 1

To a resin kettle was added 40.049 grams of polymer powder produced as in Example 1 and 93.7 grams of anhydrous DMAc. The mixture was stirred at room temperature for 45 minutes during which time the polymer swelled into a gel. The resin kettle was heated to 90° C. and stirred for 1 hour as the polymer began dissolving. Stirring was continued for an additional 5 hours, until a homogeneous mix was obtained. The mixture was dry spun into fibers (5 filament, 15 dpf) at 150 m/min. The resultant fiber properties were as follows: average tenacity=1.35 gpd, elongation=665%, permanent set after cycling=20%.

EXAMPLE 4

Injection Molding of Polyurethane Powder and Blends

Polyether and polyester urethane powders were injection molded alone or were blended with Hytrel® 4065, a polyester elastomer in various proportions from 10 weight % polyurethane to 50 weight % polyurethane. The polymers were weighed out, physically blended, and introduced into an injection molding machine at temperatures ranging from 140° C. to 240° C. The preferred temperature for polyurethane powders alone was 140° C. and for blends 170°–240° C. with injection pressures of 500–700 psi. The resultant material was appreciably softer, as measured by a Shore D penetration test, than the Hytrel® 4065. The Shore D hardness decreased monotonically with decreasing Hytrel® concentration, from a value of 4 for 100% Hytrel® 4056, to 16 for 100% polyetherurethaneurea, and to 40 for 100% polyesterurethaneurea. For Hytrel® 5556, the Shore D hardness also decreased monotonically from a value of 54 for 100% Hytrel® 5556, to the aforementioned values of 16 for polyetherurethaneurea and 10 for polyesterurethaneurea. For Hytrel® 7246 the Shore D hardness decreased monotonically from a value of 70 to the aforementioned values of 16 for polyetherurethaneurea and 10 for polyesterurethaneurea.

What is claimed is:

1. A process for making a polyurethaneurea composition comprising:
   (a) cooling an isocyanate prepolymer or a reactive precursor thereof to a temperature at or below the lesser of −100° C. or the $T_g$ of the isocyanate prepolymer;
   (b) forming a powder from said isocyanate prepolymer;
   (c) adding and mixing at least one chain extender before or after step (b); and
   (d) warming said powder to at least about room temperature to produce a polyurethaneurea.

2. The process as recited in claim 1, further comprising adding, in step (c) above, at least one chain terminator.

3. The process as recited in claim 1, wherein said chain extender is an aliphatic diamine.

4. The process as recited in claim 1, wherein said chain extender is a glycol.

5. The process as recited in claim 1, further comprising the step of injection molding or extruding the polyurethaneurea to form a shaped product.

6. The process as recited in claim 1, further comprising spinning the polyurethaneurea into a fiber.

7. The process as recited in claim 1, further comprising the step of producing a film from the polyurethaneurea.

8. The process as recited in claim 1, further comprising the step of adding non-reactive stabilizers, pigments and/or antioxidants to the prepolymer before said cooling.

9. The process as recited in claim 1, wherein said said temperature is at or below about −120° C.

10. The process as recited in claim 1, further comprising the step of mixing said prepolymer with up to about 20% of solid particles before said cooling step.

11. The process as recited in claim 10, wherein said solid particles are selected from the group consisting of poly(p-phenylenediamine terephthalate), poly(m-phenylenediamine isophthalate), nylon, and polytetrafluoroethylene, and combinations thereof.

12. The process as recited in claim 1, wherein said powder has a particle size of about 10 to about 750 μm.

13. The process as recited in claim 1, wherein said powder has an average particle diameter of about 100 to about 200 μm.

14. A process for making spandex comprising:
   (a) cooling and mixing an isocyanate prepolymer or a reactive precursor thereof to a temperature at or below the lesser of −100° C. or the $T_g$ of the isocyanate prepolymer:
   (b) forming a powder from said isocyanate prepolymer;
   (c) adding and mixing at least one chain extender before or after step (b);
   (d) warming said powder to at least about room temperature to produce a polyurethaneurea;
   (e) optionally dissolving said polyurethaneurea in a solvent; and
   (f) spinning the polyurethaneurea into spandex.

* * * * *